United States Patent
Tateno et al.

(10) Patent No.: US 9,437,005 B2
(45) Date of Patent: Sep. 6, 2016

(54) INFORMATION PROCESSING APPARATUS AND INFORMATION PROCESSING METHOD

(75) Inventors: Keisuke Tateno, Kawasaki (JP); Daisuke Kotake, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 13/538,437

(22) Filed: Jun. 29, 2012

(65) Prior Publication Data
US 2013/0010070 A1 Jan. 10, 2013

(30) Foreign Application Priority Data

Jul. 8, 2011 (JP) ................................ 2011-152158

(51) Int. Cl.
*G06T 7/00* (2006.01)
*G01B 11/00* (2006.01)
*B25J 9/16* (2006.01)

(52) U.S. Cl.
CPC ............ *G06T 7/0046* (2013.01); *B25J 9/1697* (2013.01); *G01B 11/002* (2013.01); *G05B 2219/37425* (2013.01); *G05B 2219/40548* (2013.01);

(Continued)

(58) Field of Classification Search
CPC .............. G01B 11/002; G06T 7/0046; G06T 2207/10021; G06T 7/004; B25J 9/1697; G05B 2219/37425; G05B 2219/40548
See application file for complete search history.

(56) References Cited

U.S. PATENT DOCUMENTS

| 6,847,462 B1* | 1/2005 | Kacyra et al. ................. 356/601 |
| 7,158,656 B2* | 1/2007 | Covell et al. ................. 382/106 |
| 7,889,906 B2* | 2/2011 | Smith et al. .................. 382/132 |

(Continued)

FOREIGN PATENT DOCUMENTS

| CN | 1578414 A | 2/2005 |
| CN | 1604014 A | 4/2005 |

(Continued)

OTHER PUBLICATIONS

Corke P.I., "Visual Control of Robot Manipulators—A Review", Visual Servoing, Jan. 1, 1993, XP55042324, entire document.

(Continued)

*Primary Examiner* — Manav Seth
(74) *Attorney, Agent, or Firm* — Canon U.S.A., Inc. IP Division (57) ABSTRACT

An information processing apparatus configured to estimate a position and orientation of a measuring object using an imaging apparatus includes an approximate position and orientation input unit configured to input a relative approximate position and orientation between the imaging apparatus and the measuring object, a first position and orientation updating unit configured to update the approximate position and orientation by matching a three-dimensional shape model to a captured image, a position and orientation difference information input unit configured to calculate and acquire a position and orientation difference amount of the imaging apparatus relative to the measuring object having moved after the imaging apparatus has captured an image of the measuring object or after last position and orientation difference information has been acquired, and a second position and orientation updating unit configured to update the approximate position and orientation based on the position and orientation difference amount.

15 Claims, 3 Drawing Sheets

(52) U.S. Cl.
CPC ............... *G06T2207/10021* (2013.01); *G06T 2207/30108* (2013.01)

(56) References Cited

U.S. PATENT DOCUMENTS

| | | | |
|---|---|---|---|
| 8,135,201 B2 * | 3/2012 | Smith et al. | 382/132 |
| 2010/0289797 A1 * | 11/2010 | Tateno et al. | 345/419 |
| 2010/0328682 A1 * | 12/2010 | Kotake et al. | 356/620 |
| 2011/0118872 A1 * | 5/2011 | Ortmaier et al. | 700/245 |
| 2011/0164114 A1 | 7/2011 | Kobayashi et al. | |
| 2011/0206274 A1 * | 8/2011 | Tateno et al. | 382/154 |
| 2012/0033071 A1 * | 2/2012 | Kobayashi et al. | 348/139 |
| 2012/0072021 A1 * | 3/2012 | Walser et al. | 700/254 |
| 2012/0268567 A1 * | 10/2012 | Nakazato et al. | 348/46 |
| 2013/0010070 A1 * | 1/2013 | Tateno et al. | 348/46 |
| 2013/0011018 A1 * | 1/2013 | Tateno et al. | 382/106 |

FOREIGN PATENT DOCUMENTS

| | | |
|---|---|---|
| JP | 2005-201824 A | 7/2005 |
| JP | 2011-027724 A | 2/2011 |
| WO | 2008/047872 A1 | 4/2008 |

OTHER PUBLICATIONS

Vincze, M. et al., "A Laser Tracking System to Measure Position and Orientation of Robot End Effectors Under Motion", The International Journal of Robotics Research, vol. 13, No. 4, Aug. 1, 1994, XP55042318, pp. 305-314.

Y. Hel-Or and M. Werman, "Pose estimation by fusing noisy data of different dimensions", IEEE Transactions on Pattern Analysis and Machine Intelligence, vol. 17, No. 2, pp. 195-201, Feb. 1995.

R. Y. Tsai, "A versatile camera calibration technique for high-accuracy 3D machine vision metrology using off-the-shelf TV cameras and lenses", IEEE Journal of Robotics and Automation, vol. RA-3, No. 4, pp. 323-344, Aug. 1987.

M. Vincze, J.P. Prenninger, and H. Gander, "A Laser Tracking System to Measure Position and Orientation of Robot End Effectors Under Motion", The International Journal of Robotics Research, Sep. 1, 1994, pp. 305-314, vol. 13, No. 4, Published by SAGE, Institute of Flexible Automation, University of Technology, Vienna Gusshausstr 25-29/361, A-1040 Vienna, Austria, European Patent Office Oct. 25, 2012.

Peter I. Corke, "Visual Control of Robot Manipulations—A Review", Jan. 1, 1993 (retrieved by EPO on Oct. 26, 2012 from http://reference.kfupm.edu.sa/content/v/i/visual_control_of_robot_manipulators_569323.pdf), pp. 1-31, CSIRO Division of Manufacturing Technology, Preston, Victoria, 3072, Australia.

* cited by examiner

INFORMATION PROCESSING APPARATUS AND INFORMATION PROCESSING METHOD

BACKGROUND OF THE INVENTION

1. Field of the Invention

The present invention relates to an information processing apparatus and an information processing method. In particular, the present invention relates to a technique which is suitable for measuring a position and orientation of an object whose three-dimensional shape is known.

2. Description of the Related Art

Recently, complex tasks such as assemblage of industrial products which have been manually performed are being performed by robots instead. When the robot assembles such industrial products, the robot holds a component by an end effecter, e.g., a hand, so that it becomes necessary to accurately measure a relative position and orientation between the component and the robot (i.e., robot hand).

There is a technique for accurately estimating the position and orientation of an object using, at the same time, a two-dimensional image (i.e., an intensity image or a color image) acquired by a camera and a range image acquired by a range sensor. Such a technique for accurately measuring the position and orientation of the object is discussed in [Y. Hel-Or and M. Werman, "Pose estimation by fusing noisy data of different dimensions", IEEE Transactions on Pattern Analysis and Machine Intelligence, Vol. 17, No. 2, pp. 195-201, 1995]. The above-described literature discusses treating a feature in the two-dimensional image as a three-dimensional point in which a depth is uncertain, with respect to the two-dimensional images and the range images which are input in time-series. The position and orientation of the object is then updated using a Kalman filter so that an error between the feature in the two-dimensional image and a three-dimensional model and an error between the three-dimensional point in the range image and the three-dimensional model are minimized.

The conventional technique for estimating the position and orientation of the object using the two-dimensional image and the range image assumes that an imaging apparatus freely moves. Estimation is thus performed assuming that a relative geometric relation between pieces of measurement data which are input in time-series is unknown. As a result, if the imaging apparatus is to greatly move between times for capturing the images, stability is lost, or estimation accuracy is lowered.

On the other hand, there are cases where the object is to be measured by mounting the imaging apparatus on a robot arm and moving the imaging apparatus, or a fixed imaging apparatus is to measure the object which is held by the robot arm and moved. In such cases, motion information of the robot can be referred to as the information for observing the movement of the imaging apparatus or the measuring object between image capturing times.

The motion information of the robot includes error factors such as an error originating in repetitive accuracy in controlling the robot and an error originating in calibration accuracy. Nevertheless, the motion information is highly accurate and useful information to be used in estimating the position and orientation. However, according to the conventional technique, robot motion cannot be effectively used as the observation information even if the motion information of the robot can be acquired.

Further, Japanese Patent Application Laid-Open No. 2005-201824 discuses a known technique referred to as motion stereo which simply uses the motion information. Such a technique estimates the position and orientation by adding, to an approximate position and orientation, a difference in the position and orientation acquired from the motion information.

However, as described above, the robot motion information includes a predetermined amount of ambiguity. It is thus desirable to update the position and orientation while considering the ambiguity.

SUMMARY OF THE INVENTION

The present invention is directed to allowing the position and orientation of an object to be measured with high accuracy, even when the relation in at least one of position and orientation between a measurement apparatus and a measuring object includes ambiguity.

According to an aspect of the present invention, an information processing apparatus configured to estimate a position and orientation of a measuring object using an imaging apparatus includes a three-dimensional shape model storing unit configured to store data of a three-dimensional shape model of the measuring object, an image input unit configured to acquire a captured image of the measuring object, an approximate position and orientation input unit configured to input a relative approximate position and orientation between the imaging apparatus and the measuring object, a first position and orientation updating unit configured to update the approximate position and orientation by matching the three-dimensional shape model to the image, using the approximate position and orientation, a position and orientation difference information input unit configured to calculate and acquire a position and orientation difference amount of the imaging apparatus relative to the measuring object having moved after the imaging apparatus has captured an image of the measuring object or after last position and orientation difference information has been acquired, and a second position and orientation updating unit configured to update the approximate position and orientation based on the position and orientation difference amount, using the approximate position and orientation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2A:
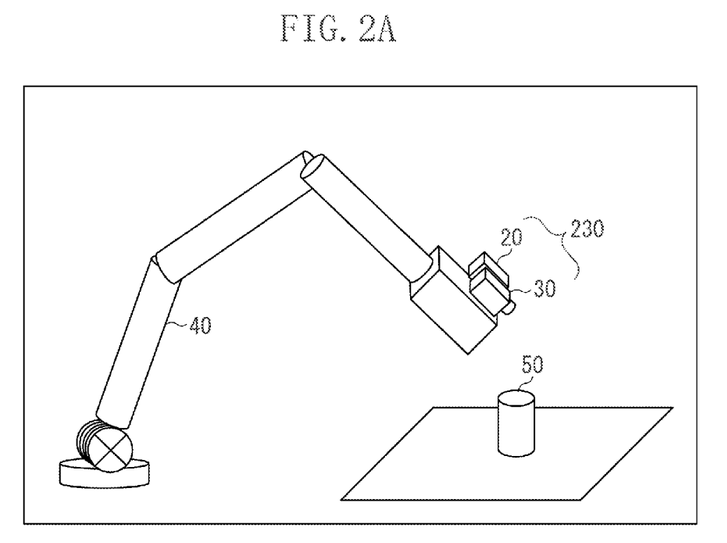
FIGS. 2A and 2B illustrate the relations among a robot arm, an imaging apparatus, and a component to be measured.

According to an exemplary embodiment of the present invention, an information processing apparatus applies a technique for estimating an object position and orientation in a scene as follows. The imaging apparatus is mounted on an end tip of the robot arm, and the robot arm is moved, so that an image of a fixed measuring object 50 is captured, as illustrated in FIG. 2A.

According to the present exemplary embodiment, the information processing apparatus performs, in one measurement, capturing of an intensity image, capturing of a range image, and acquisition of a robot motion in such an order. When the information processing apparatus captures an image (i.e., the intensity image or the range image), the information processing apparatus updates the position and orientation of the measuring object 50 by matching the three-dimensional shape model and the image. The information processing apparatus updates the position and orientation every time the information processing apparatus acquires the image.

Further, the information processing apparatus acquires from the motion information of the robot arm, the position and orientation difference amount of the imaging apparatus between the image capturing operations generated by the movement of the robot arm. The information processing apparatus then updates the position and orientation of the measuring object 50, based on the motion information. The information processing apparatus updates the position and orientation of the measuring object 50 using the information based on the robot motion, in addition to the information on the intensity image and the range image. As a result, the position and orientation of the measuring object 50 is estimated with high accuracy.

Figure 1:
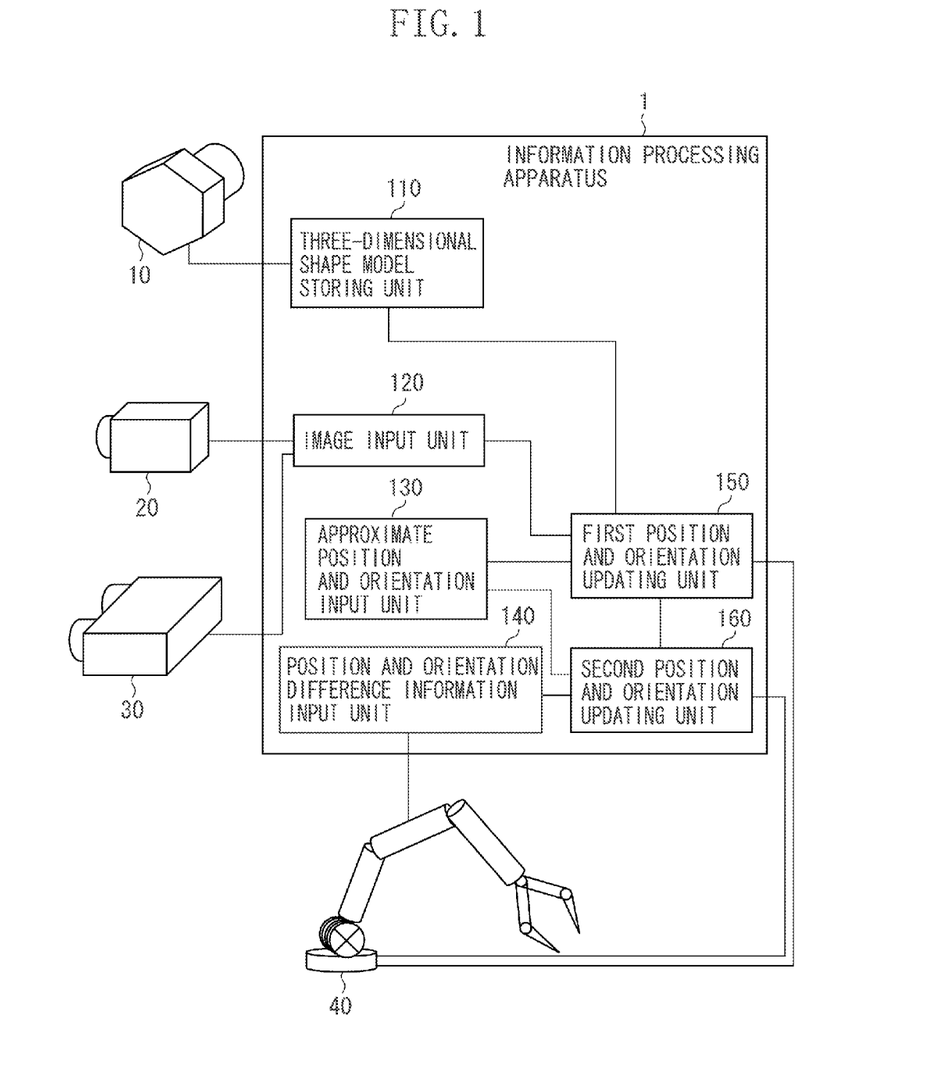
FIG. 1 illustrates a configuration of the information processing apparatus according to an exemplary embodiment of the present invention.

FIG. 1 illustrates an example of a configuration of an information processing apparatus 1 according to an exemplary embodiment of the present invention. Referring to FIG. 1, the information processing apparatus 1 includes a three-dimensional shape model storing unit 110, an image input unit 120, an approximate position and orientation input unit 130, a position and orientation difference information input unit 140, a first position and orientation updating unit 150, and a second position and orientation updating unit 160.

The three-dimensional shape model storing unit 110 stores three dimensional shape model data indicating the geometric feature of the measuring object, and is connected to the first position and orientation updating unit 150. Further, a two-dimensional image capturing apparatus 20 and a range image capturing apparatus 30 are connected to the image input unit 120. Furthermore, a robot 40 is connected to the position and orientation difference information input unit 140. According to the present exemplary embodiment, the information processing apparatus 1 is applicable when three-dimensional shape model data 10 stored in the three-dimensional shape model storing unit 110 is in accordance with a shape of the measuring object 50 whose image is to be actually captured.

The three-dimensional shape model data 10 (hereinafter referred to as a three-dimensional shape model) is three-dimensional geometric information indicating the shape of the object to be measured (hereinafter referred to as the measuring object 50 or simply as an object). The three-dimensional shape model 10 is defined by information on planes configured by a set of points or by connecting the points, and information on line segments configuring the planes. The three-dimensional shape model 10 is stored in the three-dimensional shape model storing unit 110 and input to the first position and orientation updating unit 150.

The two-dimensional image capturing apparatus 20 is a camera which normally captures the two-dimensional images which may be the intensity image or a color image. According to the present exemplary embodiment, the two-dimensional image capturing apparatus 20 outputs the intensity image. The two-dimensional image capturing apparatus 20 inputs the image captured thereby to the information processing apparatus 1 via the image input unit 120.

Internal parameters of the camera, such as a focal length and a principal point position, and a lens distortion parameter, are acquired by referring to a specification of a device to be used. Further, the internal parameters of the camera may be previously calibrated using a method discussed in [R. Y. Tsai, "A versatile camera calibration technique for high-accuracy 3D machine vision metrology using off-the-shelf TV cameras and lenses", IEEE Journal of Robotics and Automation, Vol. RA-3, No. 4, 1987].

The range image capturing apparatus 30 functions as a range data measurement unit for measuring the three-dimensional information of the points on the surface of the measuring object. According to the present exemplary embodiment, the range sensor, which outputs the range image, is used as the range image capturing apparatus 30. The range image is an image in which each pixel has depth information. Further, according to the present exemplary embodiment, a one-shot active type range sensor is used. Such a range sensor irradiates the object with multi-slit lines to which color identifications (ID) of different wavelength are attached. The range sensor then captures reflected light using the camera, and measures the range employing triangulation.

However, the range sensor is not limited to the above, and may be a time-of-flight type range sensor, which uses time-of-flight of light. Further, the range sensor may be a passive type range sensor which calculates using triangulation the depth of each pixel from the image captured by a stereo camera. Furthermore, any type of range sensor which is capable of measuring the range image may be used without changing the gist of the present invention.

The range image capturing apparatus 30 inputs to the information processing apparatus 1 via the range image input unit 120 the acquired range image. An optical axis of the range image capturing apparatus 30 matches the optical axis of the two-dimensional image capturing apparatus 20. The correspondence between each pixel in the intensity image output from the two-dimensional image capturing apparatus 20 and each pixel in the range image output from the range image capturing apparatus 30 is thus known.

The robot 40 includes a plurality of movable axes configured of rotational axes or translational axes. The robot 40 is a movable device for changing the position and orientation of the imaging apparatus including the two-dimensional image capturing apparatus 20 and the range image capturing apparatus 30. Hereinafter, the device including the two-dimensional image capturing apparatus 20 and the range image capturing apparatus 30 will be referred to as an imaging apparatus 230. According to the present exemplary embodiment, a robot arm having six-degrees-of-freedom configured of six rotatable axes is used, and the imaging apparatus 230 is mounted on an end tip of such robot arm.

The information on the six rotatable axes of the robot 40 is input to the information processing apparatus 1 via the position and orientation difference information input unit 140. The position and orientation of the imaging apparatus 230 attached to the end tip of the arm, from the end tip of the arm to the imaging apparatus 230, is previously calculated as an offset position and orientation of the imaging apparatus 230, and stored as an unchanging value. The position and orientation of the imaging apparatus 230 can be calculated by offsetting the position and orientation of the end tip of the arm using the offset position and orientation.

The device used as the robot 40 is not limited to the above, and may be a vertical articulated robot having seven rotational axes, a scalar type robot, or a parallel link robot. The robot may be of any type as long as the robot includes a plurality of movable axes including the rotational axes or the translational axes, and is capable of acquiring the motion information.

The approximate position and orientation input unit 130 inputs an approximate value of the position and orientation of the object with respect to the imaging apparatus 230. According to the present exemplary embodiment, the information processing apparatus 1 continuously performs measurement in the direction of a temporal axis. A previous measurement value (i.e., a value measured in the previous time) is thus used as the approximate position and orientation. However, the method for inputting the approximate value of the position and orientation is not limited to the above.

For example, the images of the target object captured in various orientations may be stored and used as templates in performing template matching with respect to the input images, to approximately estimate the position and orientation of the target object. Furthermore, if there are other sensors capable of measuring the position and orientation of the object, the output value of the other sensor may be used as the approximate value of the position and orientation.

The sensor may be a magnetic sensor which measures the position and orientation by detecting, using a receiver mounted on the object, a magnetic field generated by a transmitter. Further, the sensor may be an optical sensor which measures the position and orientation by capturing a marker arranged on the object, using a camera fixed to the scene. Any sensor may be used as long as the sensor is capable of measuring the position and orientation in six-degrees-of-freedom. Furthermore, if an approximate position and orientation in which the object is placed is previously known, such a value may be used as the approximate value.

The position and orientation difference information input unit 140 inputs the position and orientation difference amount of the robot 40 which has moved after the two-dimensional image or the range image has been captured, or after the position and orientation difference information has been acquired from the robot 40. According to the present exemplary embodiment, the position and orientation difference amount is calculated from the difference in the position and orientation of the end tip of the arm between the image capturing times. The position and orientation difference amount is calculated in the case where the position and orientation of the end tip of the arm can be directly acquired from a control module in the robot 40.

However, the method for calculating the difference amount of the imaging apparatus 230 between the image capturing times is not limited to the above. For example, an amount of rotation of each axis may be acquired from a rotary encoder mounted in alignment with the movable axes of the robot 40. The position and orientation of the end tip of the arm is then calculated from the rotation amount of each axis and a link length of the robot 40, employing forward kinematics calculation. The position and orientation difference amount of the imaging apparatus 230 mounted on the end tip of the arm can thus be calculated. Any method may be employed as long as the position and orientation difference amount of the end tip of the arm moving between the image capturing times can be calculated.

The first position and orientation updating unit 150 associates the three-dimensional shape model 10 stored in the three-dimensional shape model storing unit 110 with the intensity image captured by the two-dimensional image capturing apparatus 20 and/or the range image captured by the range image capturing apparatus 30. The first position and orientation updating unit 150 then updates the position and orientation of the measuring object 50, based on the approximate value of the position and orientation of the measuring object 50.

The first position and orientation updating unit 150 alternates updating the approximate position and orientation based on the two-dimensional image and updating the approximate position and orientation based on the range image. The updating process will be described in detail below.

The second position and orientation updating unit 160 updates the position and orientation of the measuring object 50 using the position and orientation difference information acquired by the position and orientation difference information input unit 140, based on the position and orientation of the measuring object 50 which has been updated by the first position and orientation updating unit 150. The updating process will be described in detail below.

The information processing apparatus 1 includes a computer. The computer includes a main control unit such as a central processing unit (CPU), and a storage unit such as a read-only memory (ROM), a random access memory (RAM), and a hard disk drive (HDD). Further, the computer may include an input/output unit such as a button, a display, and a touch panel, and may also include a communication unit such as a network card. The above-described components are connected by a bus, and are controlled by the main control unit executing a program stored in the storage unit.

Figure 3:
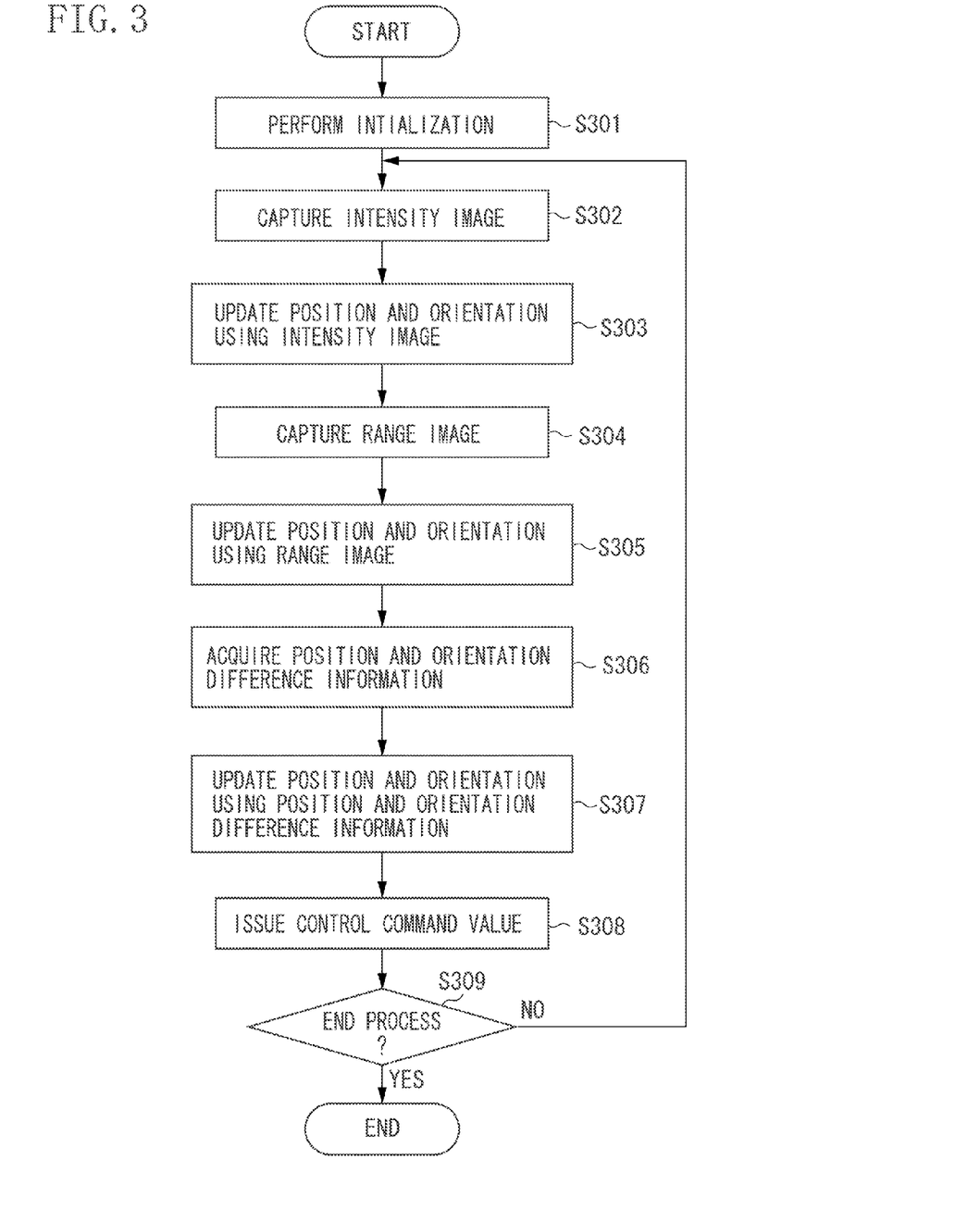
FIG. 3 is a flowchart illustrating a process for estimating the position and orientation.

The process for estimating the position and orientation according to the present exemplary embodiment will be described below. FIG. 3 is a flowchart illustrating the process for estimating the position and orientation according to the present exemplary embodiment.

In step S301, the information processing apparatus 1 performs initialization. More specifically, the approximate position and orientation input unit 130 inputs the approximate value of the relative position and orientation between the imaging apparatus 230 and the object when the intensity image has been captured. As described above, according to the present exemplary embodiment, the information processing apparatus 1 uses the position and orientation measured in the previous time as the approximate position and orientation of the measuring object 50.

In step S302, the two-dimensional image capturing apparatus 20 captures the intensity image. Upon capturing the intensity image, the process proceeds to step S303.

In step S303, the first position and orientation updating unit 150 updates the position and orientation of the measuring object 50 so that the three-dimensional shape model 10 matches the intensity image input in step S302, based on the approximate position and orientation of the measuring object 50 input in step S301. The process for updating the position and orientation using the intensity image performed in step S303 will be described in detail below.

The first position and orientation updating unit 150 associates the three-dimensional shape model 10 with edges on the intensity image captured in step S302, based on the approximate position and orientation of the measuring object 50. More specifically, the first position and orientation updating unit 150 projects each of the line segments in the three-dimensional shape model 10 onto the intensity image, using the approximate position and orientation of the measuring object 50 and internal parameters of the two-dimensional image capturing apparatus 20. The first position and orientation updating unit 150 then associates the edges detected on the image with the three-dimensional shape model 10. If a plurality of edges is detected corresponding to each control point, the first position and orientation updating unit 150 associates, with the control point, the edge on the image which is closest to the projected line segment, among the plurality of detected edges.

The first position and orientation updating unit 150 then updates the position and orientation using the calculated association data so that the error between each line segment in the three-dimensional shape model 10 and the edge on the intensity image is minimized, based on the approximate position and orientation of the measuring object 50. More specifically, the first position and orientation updating unit 150 updates the position and orientation using the calculated association data by performing filtering employing an extended Kalman filter. Coordinates of the edges detected on the intensity image are used as observation data in the filtering process employing the extended Kalman filter. The process performed for updating the position and orientation of the measuring object 50 employing the extended Kalman filter will be described in detail below. The Kalman filter is an example of a non-linear filter.

A state space model of the Kalman filter includes a state transition equation for predicting a subsequent state, and an observation equation indicating a relation between the state and an observation. According to the present exemplary embodiment, formulation is performed assuming that a state estimation performed employing the Kalman filter is used only in updating the position and orientation based on the association data within a frame. It is thus assumed that inter-frame time-series filtering is not performed. Further, a specific movement model is not assumed for the state of the measuring object 50, and a static model is applied. Furthermore, a state vector contains only six-degrees-of-freedom of the position and orientation.

The state transition equation is defined as follows:

$$x_{i+1} = Fx_i + w \quad (1)$$

In equation (1), $x_i$ is a state vector, F is a state transition matrix, w is system noise, and i is an index of the observation data (i.e., the edge detected on the intensity image) to be input to the Kalman filter. An error covariance $\Sigma w$ of the system noise w is a parameter indicating an unexpected error which occurs between the updating processes, and is generally a tuning parameter. According to the present exemplary embodiment, a covariance matrix of the system noise is given as a zero matrix.

The state vector is defined in six-degrees-of-freedom including the position and orientation as follows:

$$x_k = [tx\ ty\ tx\ wx\ wy\ wz]^T \quad (2)$$

In equation (2), tx, ty, and tz indicate the positions in the direction of x-axis, y-axis, and z-axis, respectively, and wx, wy, and wz indicate a rotation along the x-axis, the y-axis, and the z-axis, respectively. Further, since the state vector only contains the position and the orientation, the state transition matrix becomes a unit matrix.

The observation equation is defined as follows:

$$y_i = h(x_i) + v \quad (3)$$

In equation (3), $y_i$ is an observation vector (i.e., the coordinates of the edge detected on the intensity image), h ($x_i$) is an equation indicating the observation based on the image in the state $x_i$ (i.e., the projection of the three-dimensional shape model 10 on the intensity image), and v indicates observation noise. A covariance matrix $\Sigma v$ of the observation noise is a parameter defining the ambiguity of the observation vector. In step S303, the covariance matrix $\Sigma v$ indicates the ambiguity of the edge coordinates detected in the intensity image. The ambiguity of the detected coordinates is a parameter that is greatly affected by an image capturing environment or an edge detection method of the intensity image. According to the present exemplary embodiment, the covariance matrix $\Sigma v$ of the observation noise is defined assuming that noise whose average is 0 and whose standard deviation is 0.5 pixels is contained.

In the extended Kalman filter processing, the state vector (i.e., the position and orientation of the measuring object 50) is updated by repeating the prediction process and the updating process based on the state transition equation and the observation equation defined as described above. The processes for performing prediction and updating will be described in detail below.

In the prediction process, the state vector and an error covariance $P_i$ of the state vector are predicted. The state vector is predicted using the following equation:

$$x_i = Fx_{i-1} \quad (4)$$

Since the state transition matrix is a unit vector, the value of the state vector does not change in the prediction process. The error covariance $P_i$ of the state vector is predicted using the error covariance $\Sigma w$ of the system noise defined above in the equation described below.

$$P_i = FP_{i-1}F^T + \Sigma w \quad (5)$$

In equation (5), it is necessary in an initial step of the prediction process to set an initial value of the error covariance matrix $P_i$. Since the error covariance matrix $P_i$ of the state vector is a parameter indicating the ambiguity in the current state vector, an updating amount by the subsequent observation data is greatly affected by the setting of the initial value.

Qualitatively, if the error covariance is large, the updating amount based on the observation data becomes large, and if the error covariance is small, the updating amount based on the observation data becomes small. According to the present exemplary embodiment, an initial value P0 of the error covariance is set assuming that there is ambiguity of which the average is 0, the standard deviation with respect to the position is 10% of the size of the measuring object 50, and the standard deviation with respect to the orientation is 10 degrees. The initial value P0 is set in the above-described range in consideration of an unexpected difference amount of the measuring object 50 which occurs between image capturing operations.

In the updating process, the state vector and the error covariance thereof are updated based on the observation data. The state vector is updated using the following equation:

$$x_{i+1} = x_i + K_i(y_i - h(x_i)) \quad (6)$$

$K_i$ is a Kalman gain applied to the error calculated from the observation data. The Kalman gain is calculated by the following equation using the above-defined covariance matrix $\Sigma v$ of the observation noise.

$$K_i = P_i H^T (HP_i H^T + \Sigma v)^{-1} \quad (7)$$

In equation (7), H, which is generally referred to as an image Jacobian, is obtained by partially differentiating by $x_i$ the equation h (x) indicating an observation by the image. Since the equation h (x) indicating the observation by the image, an error calibration method using the edge and the generation of the image Jacobian based on the edge are not related to the gist of the present invention, the detailed description will be omitted. For details of the process, refer to [Tateno, Kotake, Uchiyama, "A Model fitting method using intensity and range images for bin-picking applications", 13th Meeting on Image and Recognition Understanding (MIRU2010), OS5-1, 2010]. Further, the error covariance matrix of the state vector is updated using the following equation:

$$P_i+1=(I-K_iH)P_i \qquad (8)$$

The first position and orientation updating unit 150 repeats the above-described prediction process and the updating process for a number of pieces of acquired observation data (i.e., edges detected in the intensity image) and thus updates the position and orientation of the measuring object 50. Upon performing the updating process using all of the observation data, the process proceeds to step S304.

In step S304, the range image capturing apparatus 30 acquires the range image. According to the present exemplary embodiment, the range image contains a distance from the imaging apparatus 230 to the surface of the measuring object 50. As described above, since the optical axis of the two-dimensional image capturing apparatus 20 matches the optical axis of the range image capturing apparatus 30, the correspondence between each pixel in the intensity image and each pixel in the range image is known.

In step S305, the first position and orientation updating unit 150 updates the position and orientation of the measuring object 50 so that the three-dimensional shape model 10 matches the range image input in step S304. The first position and orientation updating unit 150 updates the position and orientation of the measuring object 50 based on the position and orientation of the measuring object updated in step S303. The process for updating the position and orientation using the range image performed in step S305 will be described in detail below.

The first position and orientation updating unit 150 associates the three-dimensional shape model 10 with three-dimensional point groups in the range image measured in step S304, based on the position and orientation of the measuring object 50 updated in step S303. More specifically, the first position and orientation updating unit 150 projects, on the range image, each plane configuring the three-dimensional shape model 10, using the position and orientation of the measuring object 50 and the corrected internal parameters of the range image capturing apparatus 30. The first position and orientation updating unit 150 then stores the range point groups on the range image corresponding to each projected plane as the three-dimensional points corresponding to each plane.

The first position and orientation updating unit 150 then updates the position and orientation using the detected association data so that the error in the three-dimensional space between each plane in the three-dimensional shape model 10 and the three-dimensional points in the range image corresponding thereto is minimized, based on the position and orientation of the measuring object 50 updated in step S303. More specifically, the first position and orientation updating unit 150 updates the position and orientation using the detected association data by performing filtering employing the extended Kalman filter. The first position and orientation updating unit 150 performs filtering using as the observation data the coordinates of range points in the range image corresponding to each plane in the three-dimensional model. The state vector $x_i$ used in performing updating in step S303 will be continuously used as a state vector $x_j$ in step S305.

On the other hand, an error covariance $P_j$ is initialized similarly as in the error covariance initialization performed in step S303, in consideration of an unknown difference amount generated in the measuring object 50 after estimating the position and orientation in step S304. The process to be performed is substantially similar to the process performed in step S303. The differences from the process performed in step S303 are an error covariance matrix $\Sigma v$ of the observation value, the equation h(x) indicating the observation, the method for measuring the error in the measured data, and the image Jacobian based on the measured data.

The error covariance matrix $\Sigma v$ of the observation noise indicates the ambiguity in the observation of the range point group in the range image. The ambiguity of the range point group is a parameter which greatly affects the range image capturing method and the image capturing environment of the range image capturing apparatus 30. According to the present exemplary embodiment, the error covariance matrix $\Sigma v$ of the observation value of the range point group is set assuming that the noise whose average is 0 and whose standard deviation is 1 mm is contained.

Further, the process in step S305 is performed by replacing the elements in the process performed in step S303 as follows. The equation h(x) is replaced by an equation expressing the observation in the three-dimensional space, the error measurement method of the observation data is replaced by error measurement with respect to the three-dimensional points and the three-dimensional planes, and the image Jacobian is replaced by an image Jacobian based on the three-dimensional plane and points.

Since derivation of the equation h(x), the error measurement method, and the image Jacobain are not related to the gist of the present invention, the detailed description will be omitted. For details of the process, refer to [Tateno, Kotake, Uchiyama, "A Model fitting method using intensity and range images for bin-picking applications", 13th Meeting on Image and Recognition Understanding (MIRU2010), OS5-1, 2010]. The first position and orientation updating unit 150 repeats the above-described prediction process and the updating process for a number of pieces of acquired observation data (i.e., the range point groups in the rang image corresponding to each plane in the three-dimensional shape model 10), similarly as in step S303. The first position and orientation updating unit 150 thus updates the position and orientation of the measuring object 50. Upon performing the updating process using all of the observation data, the process proceeds to step S306.

In step S306, the information processing apparatus 1 uses the position and orientation difference information input unit 140 to calculate the position and orientation difference amount of the imaging apparatus 230 which has moved after capturing the range image in step S304. More specifically, the information processing apparatus 1 acquires from the control module of the robot arm via the position and orientation difference information input unit 140, the position and orientation of the end tip of the robot arm. The information processing apparatus 1 then offsets the position and orientation from the end tip of the robot arm to the imaging apparatus 230. The information processing apparatus 1 thus calculates the position and orientation of the imaging apparatus 230 when capturing the range image in step S304, and the current position and orientation (i.e., the time of performing step S306). The information processing apparatus 1 then acquires the difference between the calculated positions and orientations of the imaging apparatus 230, and calculates the position and orientation difference amount of the imaging apparatus 230 which has moved after capturing the range image.

In step S307, the second position and orientation updating unit 160 updates the position and orientation of the measuring object 50 using the position and orientation difference amount calculated in step S306, based on the position and orientation of the measuring object 50 updated in step S305. The process for updating the position and orientation using the range image performed in step S305 will be described in detail below.

More specifically, the second position and orientation updating unit 160 updates the position and orientation based on the position and orientation difference amount calculated in step S306 and the ambiguity thereof. The state vector $x_j$ used in the updating process performed in step S303 will be continuously used as the state vector x.

On the other hand, an error covariance P is initialized similarly as in the error covariance initialization performed in step S303, in consideration of an unknown difference amount generated in the measuring object 50 after estimating the position and orientation in step S306. The process to be performed is broadly similar to the process performed in step S303. However, the process of step S307 is different from the process performed in step S303 in that the observation equation in step S307 is a linear equation. The observation equation according to step S307 is defined as follows:

$$y = Hx + v \quad (9)$$

In equation (9), y is an observation vector (i.e., the position and orientation which is an updating result using the position and orientation difference amount), H is an observation matrix (i.e., a unit matrix), and v is observation noise. The covariance $\Sigma v$ of the observation noise is a parameter which defines the ambiguity of the observation vector (i.e., the position and orientation difference amount calculated in step S306). According to the present exemplary embodiment, the position and orientation difference amount is acquired as the difference in the position and orientation of the end tip of the robot arm. The ambiguity of the position and orientation difference amount is thus synonymous to the ambiguity of the position and orientation of the end tip of the robot arm.

The ambiguity of the position and orientation of the end tip of the robot arm is generated by various factors as follows. The ambiguity is due to mechanical factors such as arm rigidity and backlash, and control factors such as control accuracy of a motor and an effect of reducing mechanistic vibration. Qualitatively, the ambiguity increases as the number of movable axes increases and as directions of the movable axes overlapping in the same direction increase.

According to the present exemplary embodiment, it is assumed that the errors equally occur in the six-degrees-of-freedom of the position and orientation. The ambiguity of the position and orientation difference amount whose average is 0 and whose standard deviation is in the range of 1% of the position and orientation difference amount is thus set to occur. Further, the updating process performed in step S307 uses equation (6), equation (7), and equation (8) used in step S303 and step S305. However, the observation matrix in equation (9) is directly used as H in equation (7) and equation (8) instead of the image Jacobian. Equation (9) is an example of a linear time series filter. The updating process may be performed using another type of filter.

Furthermore, in step S303 and step S305, the edges corresponding to the three-dimensional shape model 10 or the range point groups are all used as the observation data. However, the observation data in step S307 is only the position and orientation difference amount calculated in step S306. As a result, the second position and orientation updating unit 160 updates the position and orientation of the measuring object 50 by performing the prediction process and the updating process for one observation vector. Upon performing the updating process based on the position and orientation difference amount, the process proceeds to step S308.

In step S308, the information processing apparatus 1 outputs a control command value to the robot 40 based on the position and orientation estimated in step S307. According to the present exemplary embodiment, the information processing apparatus 1 converts, into a value in a robot coordinate system, the difference between the position and orientation of the measuring object 50 before performing estimation in step S304 and after performing estimation in step S307. The information processing apparatus 1 thus calculates the control command value to be output to the robot 40. The information processing apparatus 1 outputs the control command value to the control module in the robot 40, to operate on the position and orientation for moving the end tip of the arm of the robot 40 to the measuring object 50. Upon outputting the control command value to the robot 40, the process proceeds to step S309.

In step S309, the information processing apparatus 1 determines whether there is an input to end the position and orientation estimation process. If there is such an input (YES in step S309), the process ends. If there is no such input (NO in step S309), the process returns to step S302. The information processing apparatus 1 then acquires a new image, and again calculates the position and orientation.

As described above, according to the present exemplary embodiment, when the information processing apparatus 1 acquires the motion information of the robot 40 associated with the movement of the measuring object 50 or the imaging apparatus between capturing the two-dimensional image and capturing the range image, the information processing apparatus 1 performs the following process. The information processing apparatus 1 uses the motion information of the robot 40 between the image capturing times as the observation information along with the two-dimensional image and the range image. As a result, the information processing apparatus 1 is capable of performing highly-accurate estimation of the position and orientation of the target object.

According to the above-described exemplary embodiment, the information processing apparatus 1 acquires the observation data in the following order. The information processing apparatus 1 captures the intensity image, captures the range image, and then acquires the motion information of the robot 40. However, there is no particular limit on the order of acquiring the observation data, and the information processing apparatus 1 may acquire the observation data in any order.

For example, the information processing apparatus 1 may acquire the motion information of the robot 40 and update the position and orientation. The information processing apparatus 1 may then capture the range image and update the position and orientation. Further, the information processing apparatus 1 may capture the intensity image and update the position and orientation, and then acquire the motion information of the robot and update the position and orientation. There is no particular limit on the order of acquiring the observation data and updating the position and orientation, and the processes may be performed in any order.

According to the above-described exemplary embodiment, the information processing apparatus 1 captures both the intensity image and the range image, and performs the processes. However, the information processing apparatus according to the present invention is not limited to the case where both the intensity image and the range image are captured.

For example, the information processing apparatus according to the present invention may be applied to a case where only the range image is captured or only the intensity image is captured. In such a case, only the process performed with respect to the intensity image or the range image is omitted from the process performed in the above-described exemplary embodiment, so that the process itself is not changed. Further, as described above in the modified example, there is no particular limit on the order of capturing the images and acquiring the robot motion information. There is no particular limit on omitting the acquisition process of the intensity image or the range image as long as the intensity image or the range image is captured, and any of the methods may be performed.

Figure 2B:
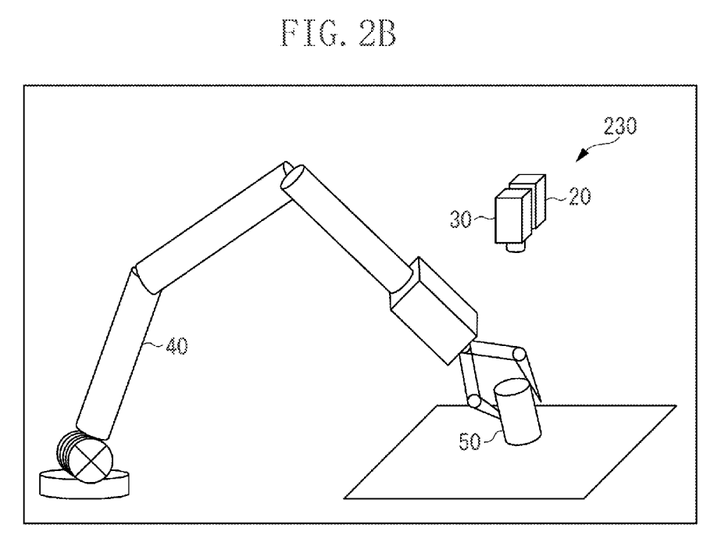

According to the above-described exemplary embodiment, the information processing apparatus according to the present invention is applied to the following case. The imaging apparatus 230 is mounted on the end tip of the robot arm as illustrated in FIG. 2A, and the position and orientation of the imaging apparatus 230 changes as a result of the movement of the robot arm. However, the information processing apparatus according to the present invention is not limited to be applied to the above-described case. For example, the information processing apparatus may be similarly applied to a case where the imaging apparatus 230 is fixed and the target object 50 held by the robot arm is moved along with the movement of the arm, as illustrated in FIG. 2B.

In such a case, the position and orientation difference information is different from the above-described exemplary embodiment. According to the above-described exemplary embodiment, the position and orientation difference information in step S306 illustrated in FIG. 3 is the position and orientation difference information of the imaging apparatus 230 moving between image capturing operations. In contrast, according to the present example, the position and orientation difference information becomes the position and orientation difference information of the measuring object 50 moving between image capturing operations. However, since the position and orientation calculated by the information processing apparatus is the relative position and orientation between the imaging apparatus 230 and the measuring object 50, there is no difference in the process from the process according to the above-described exemplary embodiment. As described above, the information processing apparatus according to the present invention is applicable to both of the case where the imaging apparatus 230 is moved and the measuring object 50 is fixed and the case where the imaging apparatus 230 is fixed and the measuring object 50 is moved. There is no particular limit on the process.

According to the above-described exemplary embodiment, the process for updating the position and orientation using the observation data and the approximate position and orientation is performed based on processing employing the extend Kalman filter and the Kalman filter. However, the method for updating the position and orientation is not limited to the above.

For example, a particle filter may be used in the updating process as a non-linear time-series filter applicable to non-linear equations. In such a case, random sampling is performed in a predetermined range based on a hypothesis of the state vector referred to as a particle, instead of performing linearization of the observation as when employing the Kalman filter. As a result, likely updating of the state vector is performed. As described above, there is no particular limit on selecting the method for updating the position and orientation of the measuring object 50, as long as the position and orientation is updated based on the observation data and the ambiguity thereof.

<An Example in Which Obtaining Moving Motion of An Imaging Apparatus is Not Limited to Using Robot Motion Information>

In the above-mentioned embodiment, as a method for calculating the position-and-orientation subtraction amount of moving of the imaging apparatus 230, the method for calculating the position-and-orientation subtraction amount from subtraction of the arm tip position-and-orientation of robot 40 in the imaging time interval is described.

However, the method for calculating the moving amount of imaging apparatus 230 is not limited to the method using robot motion information.

For example, attaching a physical sensor measuring the six-degrees-of-freedom-position-and-orientation of a magnetic sensor, a ultrasound sensor, and so on to the imaging apparatus 230, by using the measurement result, position-and-orientation subtraction amount in the imaging time interval may be calculated.

If the moving of imaging apparatus 230 in the imaging interval is limited to the rotational motion, attaching a gyro sensor to imaging apparatus 230, only the rotational subtraction amount may be measured. As far as position-and-orientation subtraction amount of the imaging apparatus 230 in the imaging time interval is calculated, any kind of method may be used.

<An Example to Operate the Work Object by Robot>

In the above-mentioned embodiment, the method for calculating the three-dimensional position-and-orientation of the fixed measuring object 50 by the imaging apparatus attached to arm tip of the robot 40 is explained.

However, the function of the information processing apparatus 1 is not limited to calculating three-dimensional position-and-orientation of the work object, by using the calculated position-and-orientation, the robot 40 may operate the work object. For example, attaching the end effecter capable of grasping the work object to arm tip of robot 40, the robot 40 may grasp the work object.

In this case, as the end effecter, the hand operated by the motor-driving or the adsorption pad adsorbing the work object may be used. As far as an appropriate device about operation for the work object is selected, the selection of the end effecter is not limited.

The calibration of relative position-and-orientation of the robot arm and the end effecter is made by common technique before the enforcement of this embodiment. By this, it is possible to translate the position-and-orientation calculated by position-and-orientation calculation unit 160 into the work space coordinate system which is fixed to the space having the palette.

Further, it becomes possible to control the robot 40 so that the hand is set to the position-and-orientation pointed in the work space coordinate system.

As operation of the end effecter for the work object, imposition work of the measuring object 50, surface inspection, and the other work may be operated. The work of the robot 40 for the measuring object 50 is not limited.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-152158 filed Jul. 8, 2011, which is hereby incorporated by reference herein in its entirety.

What is claimed is:

1. An information processing apparatus configured to estimate a position and orientation of a measuring object, the information processing apparatus comprising at least one processor coupled to at least one memory, the at least one processor being programmed to:
    store data of a three-dimensional shape model of the measuring object;
    acquire a two-dimensional image of the measuring object, wherein the two-dimensional image is captured by an imaging apparatus at a first time;
    acquire a relative position and orientation between the imaging apparatus and the measuring object;
    update the relative position and orientation between the imaging apparatus and the measuring object by associating the three-dimensional shape model with the two-dimensional image, based on the relative position and orientation;
    acquire a position and orientation difference amount of the imaging apparatus between the first time and a second time being different from the first time, wherein the relative position and orientation between the imaging apparatus and the measuring object has been changed between the first time and the second time; and
    update the updated relative position and orientation between the imaging apparatus and the measuring object based on the relative position and orientation difference amount of the imaging apparatus between the first time and the second time.

2. The information processing apparatus according to claim 1, wherein the at least one processor is further programmed to update the relative position and orientation using a non-linear time-series filter, and to update the relative position and orientation using a linear or a non-linear time-series filter.

3. The information processing apparatus according to claim 1, wherein the at least one processor is further programmed to acquire a difference amount of at least one of a position and an orientation from information on movable axes of a robot having movable axes including at least one of a rotational axis and a translational axis.

4. The information processing apparatus according to claim 1, wherein the at least one processor is further programmed to change the updated relative position and orientation between the imaging apparatus and the measuring object using a robot having movable axes including at least one of a rotational axis and a translational axis.

5. An information processing method for estimating a position and orientation of a measuring object, the information processing method comprising:
    acquiring a two-dimensional image of the measuring object, wherein the two-dimensional image is captured by an imaging apparatus at a first time;
    acquiring a relative position and orientation between the imaging apparatus and the measuring object;
    updating the relative position and orientation between the imaging apparatus and the measuring object by associating a three-dimensional shape model with the two-dimensional image, based on the acquired relative position and orientation;
    acquiring a position and orientation difference amount of the imaging apparatus between the first time and a second time being different from the first time, wherein the relative position and orientation between the imaging apparatus and the measuring object has been changed between the first time and the second time; and
    updating the updated relative position and orientation between the imaging apparatus and the measuring object based on the relative position and orientation difference amount of the imaging apparatus between the first time and the second time.

6. A non-transitory computer-readable medium storing a program that causes a computer to perform an information processing method for estimating a position and orientation of a measuring object, the information processing method comprising:
    acquiring a two-dimensional image of the measuring object, wherein the two-dimensional image is captured by an imaging apparatus at a first time;
    acquiring a relative position and orientation between the imaging apparatus and the measuring object;
    updating the relative position and orientation between the imaging apparatus and the measuring object by associating a three-dimensional shape model with the two-dimensional image, based on the acquired relative position and orientation;
    acquiring a position and orientation difference amount of the imaging apparatus between the first time and the second time being different from the first time, wherein the relative position and orientation between the imaging apparatus and the measuring object has been changed between the first time and the second time; and
    updating the updated relative position and orientation between the imaging apparatus and the measuring object based on the relative position and orientation difference amount of the imaging apparatus between the first time and the second time.

7. The information processing apparatus according to claim 1,
    wherein the two-dimensional image is captured by the imaging apparatus which is mounted on a robot arm controlled by a robot controller, and
    wherein the relative position and orientation between the imaging apparatus and the measuring object has been changed in accordance with a movement of the robot arm.

8. The information processing apparatus according to claim 1, wherein the imaging apparatus is mounted on a robot arm.

9. An information processing apparatus configured to estimate a position and orientation of a measuring object, the information processing apparatus comprising at least one processor coupled to at least one memory, the at least one processor being programmed to:

store data of a three-dimensional shape model of the measuring object;

input range information of the measuring object, wherein the range information is obtained by a range sensor at a first time;

input a relative position and orientation between an imaging apparatus and the measuring object;

update the relative position and orientation between the imaging apparatus and the measuring object by associating the three-dimensional shape model with the range information, based on the input relative position and orientation;

acquire a position and orientation difference amount of the imaging apparatus between the first time and a second time being different from the first time, wherein the relative position and orientation between the imaging apparatus and the measuring object has been changed between the first time and the second time; and     update the updated relative position and orientation between the imaging apparatus and the measuring object based on the relative position and orientation difference amount of the imaging apparatus between the first time and the second time.

10. The information processing apparatus according to claim 9, wherein the range information is obtained by a range sensor which is mounted on a robot arm controlled by a robot controller, and     wherein the relative position and orientation between the imaging apparatus and the measuring object has been changed in accordance with a movement of the robot arm.

11. The information processing apparatus according to claim 9, wherein the imaging apparatus is mounted on a robot arm.

12. An information processing method for estimating a position and orientation of a measuring object, the information processing method comprising:

inputting range information of the measuring object, wherein the range information is obtained by a range sensor at a first time;

inputting a relative position and orientation between an imaging apparatus and the measuring object;

updating the relative position and orientation between the imaging apparatus and the measuring object by associating a stored three-dimensional shape model of the measuring object with the range information based on the input relative position and orientation;

acquiring a position and orientation difference amount of the imaging apparatus between the first time and a second time being different from the first time, wherein the relative position and orientation between the imaging apparatus and the measuring object has been changed between the first time and the second time; and     updating the updated relative position and orientation between the imaging apparatus and the measuring object based on the relative position and orientation difference amount of the imaging apparatus between the first time and the second time.

13. A non-transitory computer-readable medium storing a program that causes a computer to perform an information processing method for estimating a position and orientation of a measuring object, the information processing method comprising:

inputting range image of the measuring object, wherein the range information is obtained by a range sensor at a first time;

inputting a relative position and orientation between the imaging apparatus and the measuring object;

updating the relative position and orientation between the imaging apparatus and the measuring object by associating a stored three-dimensional shape model of the measuring object with the range information based on the input relative position and orientation;

acquiring a position and orientation difference amount of the imaging apparatus between the first time and a second time being different from the first time, wherein the relative position and orientation between the imaging apparatus and the measuring object has been changed between the first time and the second time; and     updating the updated relative position and orientation between the imaging apparatus and the measuring object based on the relative position and orientation difference amount of the imaging apparatus between the first time and the second time.

14. The information processing apparatus according to claim 1, wherein the two-dimensional image is captured by the imaging apparatus which is mounted on a robot arm controlled by a robot controller, and the at least one processor is further programmed to:

obtain a first position and orientation of the imaging apparatus at the first time from the robot controller;

obtain a second position and orientation of the imaging apparatus at the second time from the robot controller; and     acquire the position and orientation difference amount of the imaging apparatus between the first time and the second time based on the first position and orientation of the imaging apparatus and the second position and orientation of the imaging apparatus.

15. The information processing apparatus according to claim 9, wherein the range information is obtained by a range sensor which is mounted on a robot arm controlled by a robot controller, and the at least one processor is further programmed to:

obtain a first position and orientation of the imaging apparatus at the first time from the robot controller; and     obtain a second position and orientation of the imaging apparatus at the second time from the robot controller; and     acquire the position and orientation difference amount of the imaging apparatus between the first time and the second time based on the first position and orientation of the imaging apparatus and the second position and orientation of the imaging apparatus.

\* \* \* \* \*